United States Patent
Wachenheim et al.

(10) Patent No.: US 8,352,104 B2
(45) Date of Patent: Jan. 8, 2013

(54) METHOD AND DEVICE FOR SERVOCONTROLLING AN AIRCRAFT SPEED-WISE IN AN APPROACH PHASE

(75) Inventors: Maxime Wachenheim, Toulouse (FR); Jean-Louis De Menorval, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 594 days.

(21) Appl. No.: 12/617,359

(22) Filed: Nov. 12, 2009

(65) Prior Publication Data

US 2010/0125382 A1   May 20, 2010

(30) Foreign Application Priority Data

Nov. 14, 2008   (FR) ...................................... 08 06362

(51) Int. Cl.
*G06F 19/00* (2011.01)

(52) U.S. Cl. ............ 701/18; 701/16; 244/180; 244/181; 244/183; 244/186

(58) Field of Classification Search .................... 701/18; 244/183

See application file for complete search history.

(56) References Cited

U.S. PATENT DOCUMENTS

| | | | |
|---|---|---|---|
| 6,718,236 B1 | 4/2004 | Hammer et al. | |
| 2008/0103646 A1* | 5/2008 | Lucas et al. | 701/14 |
| 2008/0140272 A1* | 6/2008 | Zadrozynski et al. | 701/14 |
| 2008/0228333 A1 | 9/2008 | De Menorval et al. | |
| 2008/0243314 A1 | 10/2008 | Ridenour | |

OTHER PUBLICATIONS

Abbott, Terence S., "Spped Control Law for Precision Terminal Area In-Trail Self Spacing", NASA/TM-2002-211742, XP002537529, pp. 5-9, Jul. 2002.

* cited by examiner

*Primary Examiner* — Behrang Badii
*Assistant Examiner* — Aaron L Troost
(74) *Attorney, Agent, or Firm* — Novak Druce + Quigg LLP

(57) ABSTRACT

A method and device for servocontrolling an aircraft speed-wise in an approach phase. The device can adapt to the estimated time of passage of the aircraft at a particular point of the approach trajectory, the position of the start of deceleration of the aircraft in the approach phase.

9 Claims, 4 Drawing Sheets

METHOD AND DEVICE FOR SERVOCONTROLLING AN AIRCRAFT SPEED-WISE IN AN APPROACH PHASE

CROSS-REFERENCE TO RELATED APPLICATIONS

This application claims priority to French Patent Application 0806362, filed Nov. 14, 2008, the entire contents of which are incorporated herein by reference.

FIELD OF THE INVENTION

The present invention relates to a method and device for servocontrolling speed-wise an aircraft that is guided along an approach trajectory, in an approach phase for a landing.

BACKGROUND OF THE INVENTION

The present invention applies to aircraft guidance, such as the guidance of transport airplanes in particular, during the terminal phase of a landing, that is, during the final deceleration phase before landing on a landing runway. The object of the present invention is to assure the aircraft of a given time of passage, of RTA (required time of arrival) type, at a particular waypoint that is situated on the approach trajectory followed during this approach phase, notably at the point of the approach trajectory, which is situated at the level of the upstream threshold of the landing runway.

Document FR-2 913 780 discloses a method and a device for assisting in the guidance of an aircraft, the object of which is to make the aircraft observe a target time of passage at a given point. This point can notably be situated in a landing phase. It may, in particular, be a point of convergence at which the different aircraft (which are expecting to land at one and the same airport) converge before performing the final landing phase.

Moreover, it is known that many flight management systems (FMS) contain a particular function that allows speed servocontrol to be implemented in order to enable the aircraft to meet a time constraint, of RTA type, at a particular point of the flight.

Such speed servocontrol is, however, performed only during cruising and descent phases. It is known that a descent phase is the flight phase between, on the one hand, the cruising phase, and, on the other hand, the approach phase considered in the present invention.

Particularly because of strict guidance constraints during the terminal landing phase, such common speed servocontrol is not implemented in the approach phase. In the context of the present invention, it is assumed that the approach phase corresponds exclusively to the phase during which the aircraft decelerates from a so-called descent speed, for example 250 knots (approximately 130 meters per second), to a so-called approach speed which corresponds to the speed at which the aircraft must overfly the upstream threshold of the runway used for the landing.

Consequently, the usual solutions do not make it possible to ensure an exact time of passage at any point of the approach trajectory during the approach phase, notably at the threshold of the landing runway, because no flexibility is allowed in relation to the flight time for the approach phase. In practice, the flight time in relation to the approach phase is always the same, since, usually, the duration of the approach phase corresponds precisely to the time needed to decelerate from the descent speed to the approach speed.

More specifically, to servocontrol the aircraft speed-wise during this approach phase, the following operations are usually carried out:

A/ a speed profile is determined which illustrates a variation of the speed of the aircraft as a function of the distance of said aircraft relative to the threshold of the landing runway used for the landing;

B/ speed set points are calculated to enable the aircraft to observe this speed profile; and C/ during the approach phase, said speed set points are applied to the aircraft, while guiding it along said approach trajectory.

This usual speed servocontrol is therefore performed without taking into account a time constraint, of RTA type. Consequently, a delay or an advance of the aircraft relative to a desired time of passage above the threshold of the runway, that is to say relative to its landing time, cannot be corrected during the approach phase.

SUMMARY OF THE INVENTION

The object of the present invention is to overcome these drawbacks. It relates to a method for servocontrolling speed-wise an aircraft that is guided along an approach trajectory, in an approach phase for a landing on a landing runway, said approach phase being a phase during which the aircraft decelerates from a descent speed to an approach speed, the aim of said method being to ensure that the aircraft can pass a given point of the approach trajectory at a given time.

To this end, according to the invention, said method whereby:

A/ a speed profile is determined which illustrates a variation of the speed of the aircraft along the approach trajectory, as a function of the (horizontal) distance of said aircraft relative to a fixed point that is linked to said landing runway (used for the landing), said speed profile comprising a reference deceleration point which corresponds to the point where the aircraft has to begin to decelerate from the descent speed, this reference deceleration point being situated at a reference horizontal distance from said fixed point;

B/ speed set points are calculated to enable the aircraft to observe said speed profile; and C/ during the approach phase, said speed set points are applied to the aircraft, while guiding it along said approach trajectory, is noteworthy in that:

α) an auxiliary horizontal distance is calculated by adding a first horizontal margin to said reference horizontal distance, and an auxiliary deceleration point is defined which is located upstream of said fixed point of said auxiliary horizontal distance along said approach trajectory;

β) during the approach phase, when the aircraft reaches a control point of the approach trajectory, which is situated upstream of said auxiliary deceleration point at least by a second horizontal margin, a check is carried out to see if said aircraft is able to reach an auxiliary fixed point downstream of the approach trajectory, at a required time of passage, within a time difference, if it observes said speed profile; and γ) according to this check, an effective deceleration point is defined, at which the aircraft must effectively begin deceleration as defined on this speed profile at said reference deceleration point in order to make it follow this speed profile, this effective deceleration point which is used for servocontrolling the aircraft speed-wise corresponding:

to said auxiliary deceleration point if, according to said check, said aircraft will pass said auxiliary fixed point at said required time of passage; or at a first offset point which is situated upstream of said auxiliary deceleration point if, according to said check, the aircraft will be ahead at said auxiliary fixed point, thereby making it possible to move forward the speed reduction so as to lose the time the aircraft has gained; or at a second offset point which is situated downstream of said auxiliary deceleration point if, according to said check, the aircraft will be behind at said auxiliary fixed point, thereby making it possible to delay the speed reduction so as to make up for the delay.

Thus, since, thanks to the invention, an auxiliary deceleration point is provided which is situated upstream of the usual deceleration point (called the reference deceleration point), there is a distance margin which can be used to modify the point at which the deceleration is actually begun (called the effective deceleration point). Furthermore, by using an estimation (specified below) of the time of passage at a particular point (auxiliary fixed point), at which the aircraft must observe a required time of passage, it is possible to determine any delay or advance of the aircraft, and thus calculate, if necessary, an offset (by distance) to be applied to said auxiliary deceleration point to obtain the effective deceleration point (where the deceleration of the aircraft from its descent speed in the approach phase will begin).

The method according to the invention can be implemented simply, since the speed profile, which is calculated in the usual manner, is not modified. The point (effective deceleration point) where the deceleration of the aircraft (or speed reduction) begins, from its descent speed (which is the initial speed of this approach phase) is simply offset along the approach trajectory which is also unmodified. Then, the speed profile which represents a variation of the speed of the aircraft as a function of the distance of the latter relative to a fixed point linked to the landing runway, in particular the upstream threshold of the runway, is applied as it is.

Advantageously, an offset point is offset, upstream or downstream (depending on whether the aircraft is ahead or behind), relative to said auxiliary deceleration point, by a distance D1 which satisfies the following equation:

$$D1 = \frac{\Delta T}{\frac{1}{Vapp} - \frac{1}{Vdes}}$$

in which:
Vapp is the approach speed;
Vdes is the descent speed; and
$\Delta T$ represents a time adjustment to be made for the aircraft to reach said auxiliary fixed point at said required time of passage.

Furthermore, advantageously:
said fixed point and said auxiliary fixed point correspond to the same point of the approach trajectory, preferably the upstream threshold of the landing runway; and/or
said first and second horizontal margins are equal.

Furthermore, in the usual manner, in the step A/, said speed profile is determined by a retrograde calculation from the threshold of the landing runway where the aircraft must fly at the approach speed until at least a start of deceleration point from the descent speed, which corresponds to said reference deceleration point.

Moreover, in a preferred embodiment, in the step 13), the following operations are carried out:
an estimated time of passage at said auxiliary fixed point is calculated, as a function of the time of passage of the aircraft at said control point, the horizontal distance between said control point and said auxiliary fixed point, and said speed profile determined in the step A/;
the difference between said estimated time of passage and said required time of passage is calculated;
this difference is compared to said time difference; and
from this difference, a determination is made as to which of the following situations will apply:
the aircraft will be able to observe the required time of passage at said auxiliary fixed point;
the aircraft will be ahead;
the aircraft will be behind.

Furthermore, advantageously, an approach profile is determined which the aircraft is made to follow, said approach profile comprising said speed profile and at least aerodynamic configuration information associated with said speed profile. This information notably gives the different positions to which the leading edge slats and flaps of an airplane must be set according to its horizontal distance relative to said fixed point linked to the landing runway used.

The present invention also relates to a device for servocontrolling speed-wise an aircraft that is guided along an approach trajectory, in an approach phase for a landing on a landing runway.

According to the invention, said device of the type comprising:
a flight management system that determines a speed profile which illustrates a variation of the speed of the aircraft along the approach trajectory as a function of the horizontal distance of said aircraft relative to a fixed point that is linked to said landing runway used for the landing, said speed profile comprising a reference deceleration point that corresponds to the point where the aircraft must begin to decelerate from the descent speed, this reference deceleration point being situated at a reference horizontal distance from said fixed point;
computation means that compute speed set points enabling the aircraft to observe said speed profile; and
a guidance system which, during the approach phase, applies said speed set points to the aircraft, while guiding it along said approach trajectory,
is noteworthy in that it also comprises:
first means for computing an auxiliary horizontal distance, by adding a first horizontal margin to said reference horizontal distance, and defining an auxiliary deceleration point that is situated upstream of said fixed point by said auxiliary horizontal distance along said approach trajectory;
second means for checking, during the approach phase, when the aircraft reaches a control point of the approach trajectory, which is situated upstream of said auxiliary deceleration point at least by a second horizontal margin, if said aircraft is able to reach an auxiliary fixed point downstream of the approach trajectory, at a required time of passage, within a time difference, if it observes said speed profile; and
third means for defining, according to the check implemented by said second means, an effective deceleration point, at which the aircraft must effectively begin the deceleration as defined on the speed profile at said reference deceleration point in order to make it follow this speed profile, this effective deceleration point which is used for servocontrolling the aircraft speed-wise corresponding:

- to said auxiliary deceleration point if, according to the check, said aircraft will reach said auxiliary fixed point at said required time of passage; or
- to a first offset point that is situated upstream of said auxiliary deceleration point if, according to said check, the aircraft will be ahead at said auxiliary fixed point; or
- to a second offset point that is situated downstream of said auxiliary deceleration point if, according to said check, the aircraft will be behind said auxiliary fixed point.

Furthermore, advantageously, said device also comprises means for determining said approach trajectory, and said guidance system comprises means for laterally and vertically guiding the aircraft along said approach trajectory.

Moreover, the present invention also relates to an aircraft that includes a speed servocontrol device, such as that mentioned above.

BRIEF DESCRIPTION OF THE DRAWINGS

The figures of the appended drawing will clearly show how the invention can be implemented. In these figures, identical references designate similar elements.

DETAILED DESCRIPTION

Figure 1:
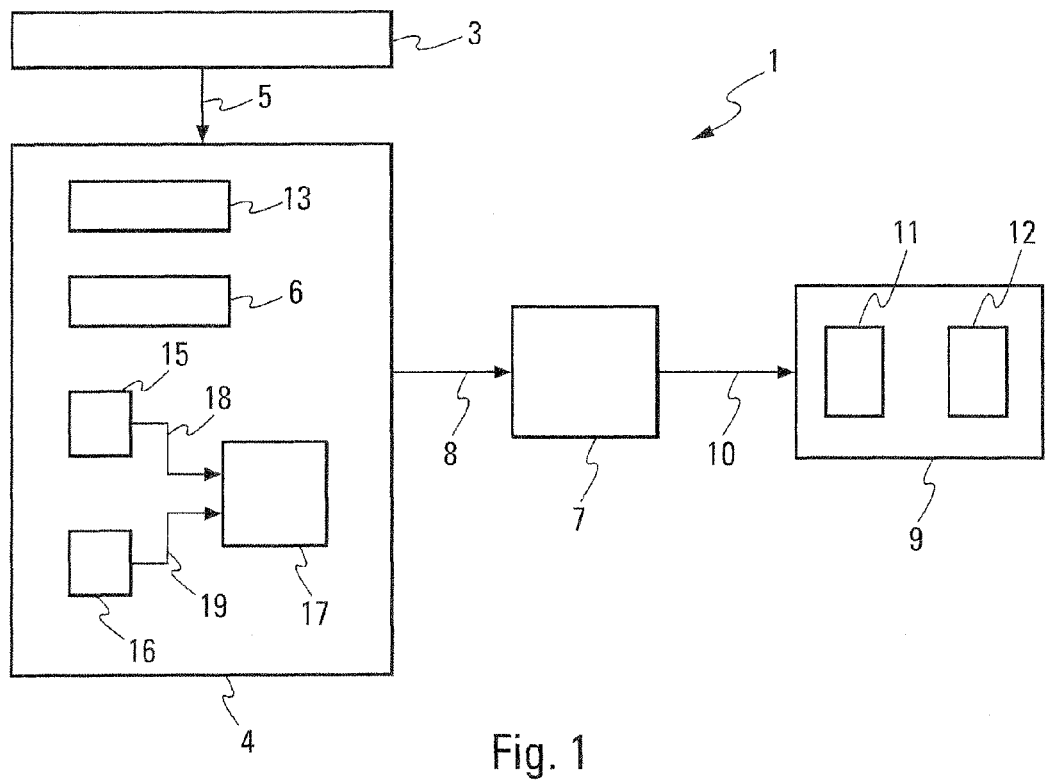
FIG. 1 is the block diagram of a servocontrol device according to the invention.

The device 1 according to the invention and diagrammatically represented in FIG. 1 is intended to servocontrol an aircraft (not represented) speed-wise, in particular a transport airplane, which is guided along an approach trajectory (also not represented), in an approach phase for a landing on a landing runway of an airport.

In the context of the present invention, the approach phase is considered to correspond exclusively to a phase during which the aircraft is decelerated from a so-called descent speed, for example 250 knots (approximately 130 meters per second), to a so-called approach speed which corresponds to the speed at which the aircraft must overfly the upstream threshold of the runway used for the landing.

Figure 3:
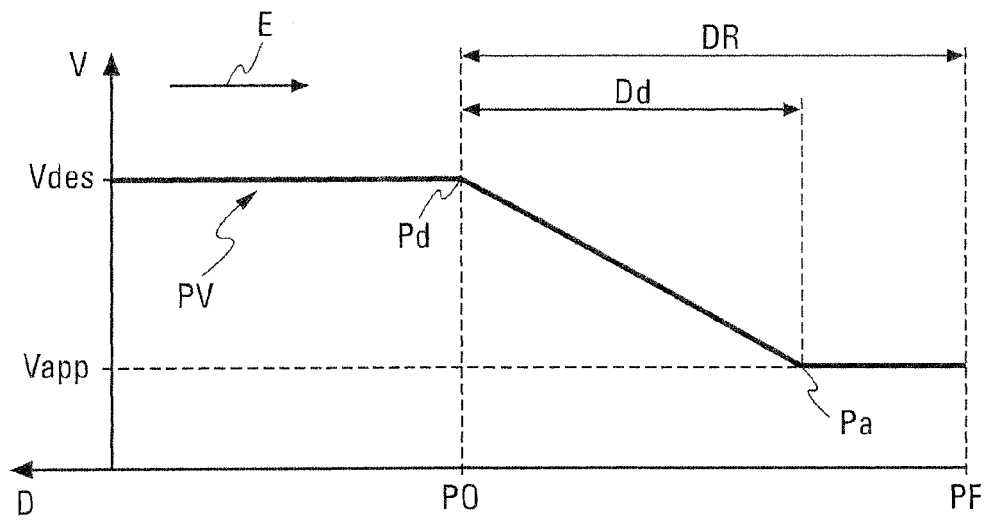
FIGS. 3 to 7 are graphs illustrating the characteristics and benefits of a deceleration position offset, implemented by a device according to the invention.

To implement speed servocontrol, the device 1 that is onboard the aircraft, comprises:

- a set 3 of information sources that are capable of determining the current values of a plurality of parameters (position, speed, altitude, etc.) of the aircraft during the flight;
- a flight management system 4, for example of FMS type, which comprises means 6 capable of determining a speed profile PV that illustrates a variation of the speed V of the aircraft along the approach trajectory, as a function of the horizontal distance D of said aircraft relative to a fixed point PF which is linked to the landing runway used for the landing, as represented in FIG. 3;
- computation means 7 that are linked via a link 8 to said flight management system 4 and that are set up in such a way as to compute, in the usual manner, speed set points to enable the aircraft to observe said speed profile PV received from said system 4; and
- a guidance system 9 that is linked via a link 10 to said computation means 7 and that comprises means 11 for applying to the aircraft the speed set points computed by said computation means 7, in the course of the flight of said aircraft during the approach phase, so as to servocontrol said aircraft speed-wise.

In a standard flight of a transport airplane, from a cruising phase, the latter generally follows, in succession, the following phases, up to the landing on a landing runway of an airport:

- the cruising phase, in which it flies at a cruising speed; then
- a descent phase which comprises a segment flown at constant Mach, then a segment flown at a constant calibrated air speed (CAS); then
- the abovementioned approach phase, in which the aircraft decelerates from the descent speed to the approach speed.

In the context of the present invention, said guidance system 9 is a standard system which also comprises, in addition to said means 11 controlling the longitudinal guidance of the aircraft along the approach trajectory (by implementing speed servocontrol), standard means 12 that implement lateral guidance and vertical guidance of the aircraft along said approach trajectory. This guidance system 9 notably comprises, in the usual manner:

- a guidance computer which computes (according to received set points) commands to be applied to controlled elements of the aircraft, in particular control surfaces, engines and/or brakes; and
- standard actuation means for said controlled elements, that apply these commands to said controlled elements.

To modify the speed of the aircraft, said guidance system 9 can act in particular on standard braking means, on engines, on aerodynamic braking elements, and on the aerodynamic configuration of the aircraft.

Furthermore, said computation means 7 can be independent means or means that are incorporated either in said flight management system 4 or in said guidance system 9.

Moreover, said flight management system 4 can also include means 13 for determining, in the usual manner, said approach trajectory.

As represented in FIG. 3, the speed profile PV illustrates the variation of the speed V of the aircraft as a function of the horizontal distance D (that is, the distance defined in the horizontal plane, in which the approach trajectory of the aircraft is projected) between the current position of the aircraft and a fixed point PF specified hereinbelow. This speed profile PV, which is applied during the approach phase, therefore begins at the descent speed Vdes and ends at the approach speed Vapp. It comprises, in succession (in the direction of flight E):

- a level at the descent speed Vdes up to a reference point Pd, from which the aircraft begins to decelerate;
- a continuous deceleration from the descent speed Vdes to the approach speed Vapp between the reference point Pd and a point Pa, over a horizontal distance D; and
- a level at the approach speed Vapp between the point Pa and said fixed point PF, in particular the upstream threshold of the landing runway.

In a standard implementation that will be refined by the present invention, the reference point Pd is situated at a reference horizontal distance DR from said fixed point PF, which is illustrated by a point P0 on FIGS. 3 to 6.

In a preferred embodiment, said means 6 determine, in the usual manner, said speed profile PV by a retrograde computation from the threshold of the landing runway where the aircraft must fly at the approach speed Vapp up to at least one deceleration start point from the descent speed, which corresponds to said reference deceleration point Pd. More simply, it is assumed that the aircraft is accelerated in the direction opposite to the direction of flight E from the landing runway (where the aircraft is in approach configuration with the landing gear lowered, and the leading edge slats and the flaps in the landing position), by retracting the leading edge slats and the flaps at aerodynamic configuration change speeds, until the descent speed Vdes is reached.

Figure 4:
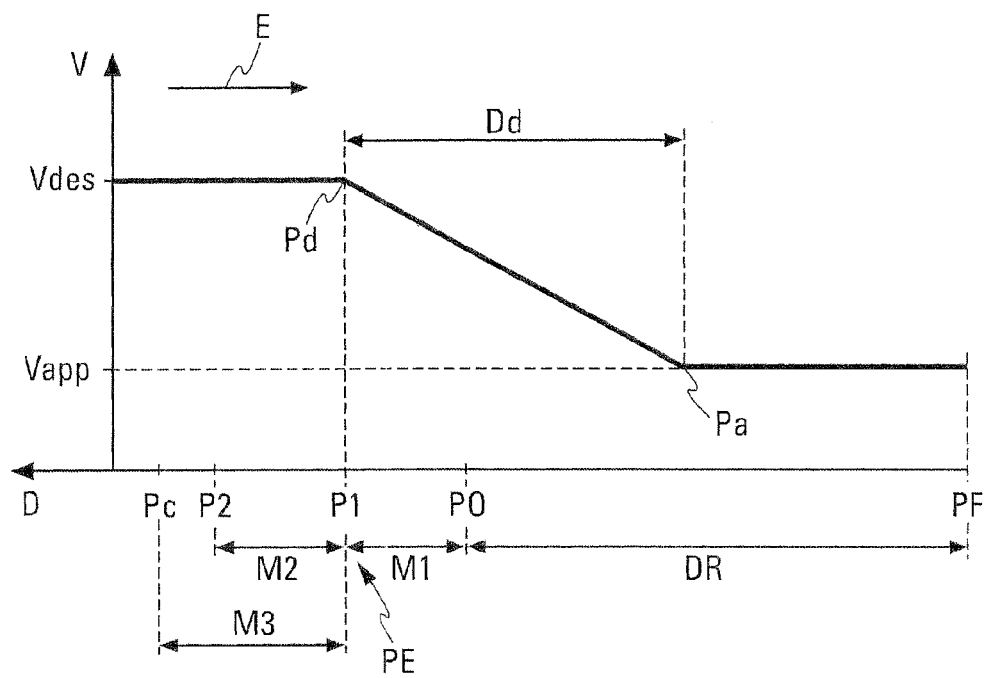

To enable the aircraft to be able to reach a given point of the approach trajectory at a given time, said device 1 also comprises, according to the invention:

means 15 for computing an auxiliary horizontal distance D0, by adding a horizontal margin M1 to said reference horizontal distance DR and thus defining an auxiliary deceleration point P1 which is situated upstream in the direction E of flight of the aircraft of said fixed point PF, namely by said auxiliary horizontal distance D0 along the approach trajectory, as represented in FIG. 4;

a checking unit 16 for checking, in the approach phase, when the aircraft reaches a control point Pc of the approach trajectory, which is situated upstream of said auxiliary deceleration point P1 at least by a second horizontal margin M2, if said aircraft is able to reach an auxiliary fixed point downstream of the approach trajectory, at a required time of passage (within a time difference) if it observes said speed profile PV. In the example of FIG. 4, the point Pc is located at a horizontal distance M3 from the point P1, M3 being greater than M2. Said auxiliary fixed point may be any point of the approach trajectory. Preferably, however, it corresponds to the threshold of the landing runway, that is to say to said fixed point PF; and means 17 that are linked via links 18 and 19 respectively to said means 15 and to said checking unit 16 and that are set up in such a way as to define, according to the check implemented by said checking unit 16, an effective deceleration point PE, at which the aircraft must effectively begin deceleration as defined in the speed profile PV at said reference deceleration point Pd in order to have it follow this speed profile PV.

Figure 5:
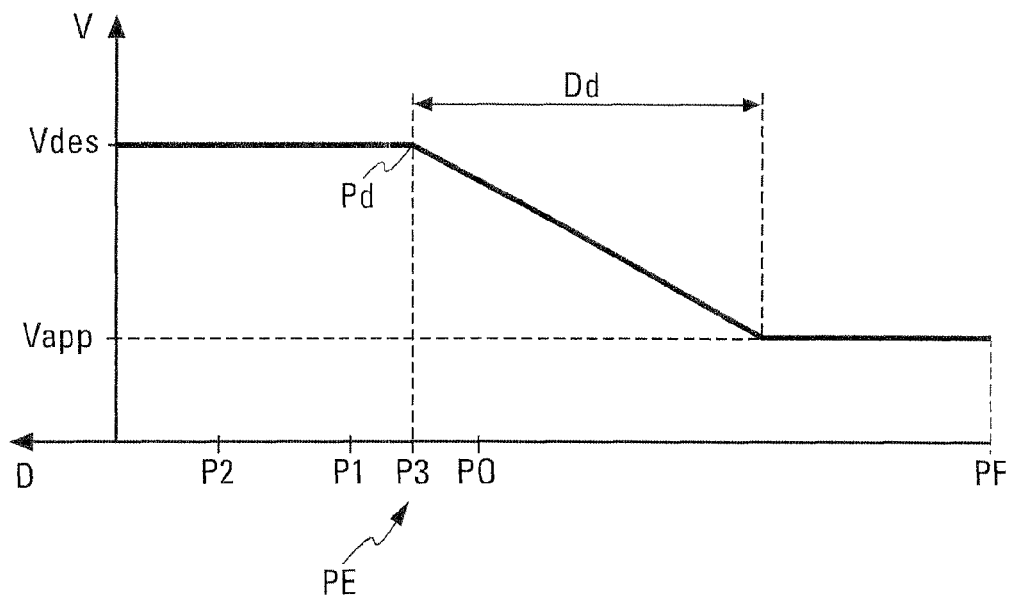
Figure 6:
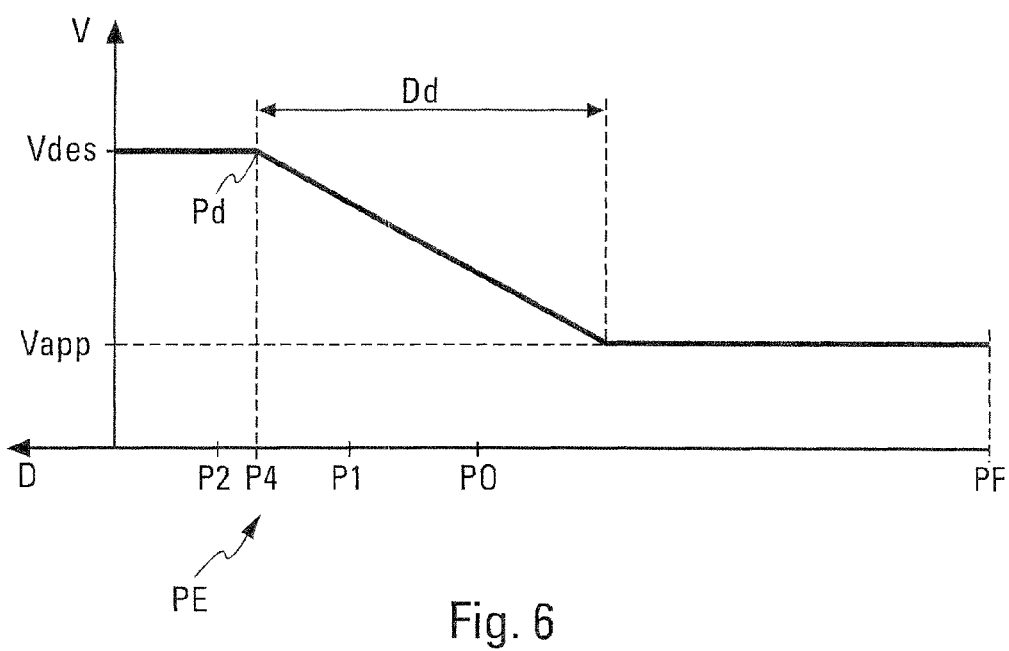

This effective deceleration point PE, which is used for servocontrolling the aircraft speed-wise, corresponds, according to the invention:

to said auxiliary deceleration point P1 if, according to the check implemented by the unit 16, said aircraft will reach said auxiliary fixed point at said required time of passage, as represented in FIG. 4; or to an offset point P4 that is located upstream of said auxiliary deceleration point P1 (between the points P2 and P1) if, according to said check, the aircraft will be ahead of said auxiliary fixed point, as represented in FIG. 6; or to an offset point P3 that is situated downstream of said auxiliary deceleration point P1 (between the points P1 and P0) if, according to said check, the aircraft will be behind said auxiliary fixed point, as represented in FIG. 5.

Figure 2:
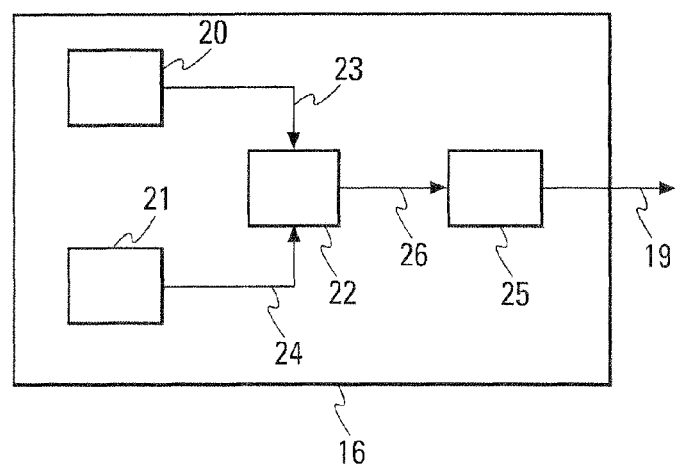
FIG. 2 is the block diagram of a verification unit forming part of a device according to the invention.

In a particular embodiment, said checking unit 16 (which can be independent or be integrated, as represented in FIG. 1, at least partly, in the flight management system 4) comprises, as illustrated in FIG. 2:

means 20 for computing an estimated time of passage at said auxiliary fixed point, as a function of the time of passage of the aircraft at said control point Pc, the horizontal distance between said control point Pc and said auxiliary fixed point, and said determined speed profile PV;

means 21 for providing a required time of passage at said auxiliary fixed point. These means 21 may correspond to input means, such as a keyboard for example, enabling a pilot of the aircraft to enter this required time of passage;

means 22 that are linked via links 23 and 24 respectively to said means 20 and 21 and that are set up in such a way as to compute the difference between said estimated time of passage and said required time of passage; and means 25 that are linked via a link 26 to said means 22 and that are set up in such a way as to compare this difference to said time difference and determine, from this difference, which of the following situations will apply:

the aircraft will be able to observe the required time of passage at said auxiliary fixed point (within said time difference);

the aircraft will be ahead at said auxiliary fixed point;

the aircraft will be behind at said auxiliary fixed point.

Thus, since the device 1 according to the invention provides an auxiliary deceleration point P1 that is located upstream of the standard deceleration point (reference deceleration point. P0), it has a distance margin M1 that can be used to modify the point PE, at which deceleration is effectively begun (called the effective deceleration point). More specifically, the point PE can be defined between a point P2 (situated upstream of the point P1 by a margin M2) and said point P0 (situated downstream of the point P1 by the margin M1). Preferably, these margins M1 and M2 are equal so as to obtain a distance band (offset band) that is centered on the point P1.

Furthermore, using an estimation of the time of passage at the particular point (auxiliary fixed point), at which the aircraft must observe a required time of passage, the checking unit 16 of the device 1 is able to determine any delay or any advance of the aircraft, and the means 17 can then compute, if necessary, within the distance band defined by the margins M1 and M2, an offset (in distance) to be applied relative to said auxiliary deceleration point P1 to obtain the effective deceleration point PE (where deceleration of the aircraft from its descent speed Vdes will actually begin in the approach phase).

The device 1 according to the invention can be implemented simply, since it does not modify the speed profile PV which is calculated in the usual manner using means 6. It simply offsets, along the approach trajectory which is also not modified, the point PE (effective deceleration point) where deceleration (or speed reduction) of the aircraft begins, from its descent speed Vdes (which is the initial speed of the approach phase). Then, it applies unchanged the speed profile PV which represents a variation of the speed V of the aircraft as a function of the distance D of the latter relative to a fixed point PF linked to the landing runway, in particular the upstream threshold of the runway.

In the example of FIG. 4, the checking unit 16 has concluded, at the control point Pc, that the aircraft will arrive at the required time of passage at said fixed point (within the time difference) so that the device 1 causes the deceleration to begin at said point P1. The situation of FIG. 4 therefore represents the basic situation of the present invention, to have the aircraft observe the required time of passage.

The examples of FIGS. 5 and 6 correspond to situations that deviate from the basic situation of FIG. 4.

In the example of FIG. 5, the checking unit 6 has concluded that, if the aircraft implements the basic situation of FIG. 4, it will arrive with delay (relative to said required time of passage) at said auxiliary fixed point. Hence, to enable the aircraft to make up this delay, the device 1 causes the aircraft to fly (during the approach phase) for longer at the maximum speed, that is to say, at said descent speed Vdes, than in the basic situation of FIG. 4, and therefore triggers the deceleration from this descent speed Vdes later. This is obtained, by determining the point P3 which is situated downstream of said auxiliary deceleration point P1. This distance offset (between P1 and P3), during which the aircraft will continue flying at the descent speed Vdes, is chosen so as to enable the delay to be made up.

Furthermore, in the example of FIG. 6, the checking unit 16 has concluded that the aircraft will be ahead at said auxiliary fixed point, relative to said required time of passage. Hence, to enable the aircraft to lose this advance, the device 1 reduces the maximum speed of the aircraft, that is to say, said descent speed Vdes, earlier in the approach phase relative to the basic situation of FIG. 4, and it therefore anticipates the deceleration that will thus be implemented at the point P4 situated upstream of said point P1.

In a preferred embodiment, an offset point P3 or P4 is offset, downstream or upstream, relative to said auxiliary deceleration point P1, by a distance D1 which is computed by the means 17 using the following equation:

$$D1 = \frac{\Delta T}{\frac{1}{Vapp} - \frac{1}{Vdes}}$$

in which ΔT represents the time adjustment to be made for the aircraft to reach said auxiliary fixed point at said required time of passage.

For a civilian transport airplane, by taking into account usual values for the descent and approach speeds of such an airplane, an offset distance of the order of 1.5 nautical miles makes it possible to correct a time offset ΔT (ahead or behind) of 15 seconds. Thus, if the device 1 is to be robust to a delay or advance of 15 seconds in such an application, a value of 1.5 nautical miles is provided for the margins M1 and M2.

Figure 7:
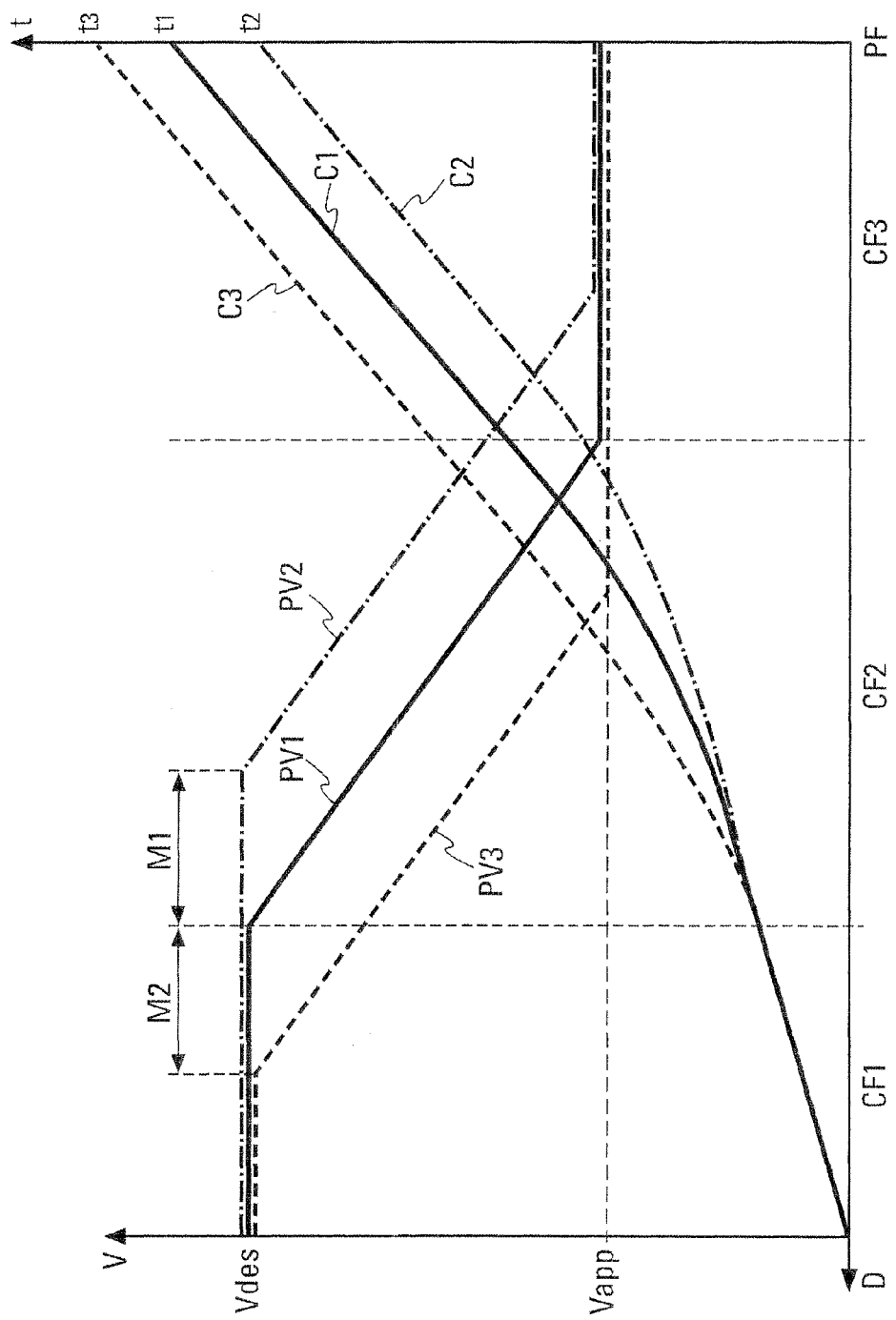

In FIG. 7, two sets of curves, which both depend on the distance D relative to the fixed point PF concerned, are overlaid on a single graph. The first set of curves PV1, PV2 and PV3 indicates the speed V applied to the aircraft, and the second set of curves C1, C2 and C3 indicates the duration t from the start of the approach phase. The duration curves C1, C2 and C3 are respectively associated with the speed profiles PV1, PV2 and PV3. This graph clearly shows the corrections that are likely to be made by the device 1 according to the invention to enable the aircraft to reach a given point of the approach trajectory at a given time. In the example represented, the aircraft will reach the fixed point PF at the times t1, t2 and t3, if it respectively observes the speed profiles PV1, PV2 and PV3.

In a preferred embodiment, said device 1 determines and also makes said aircraft follow an approach profile that comprises said speed profile PV and at least aerodynamic configuration information associated with said speed profile PV. FIG. 7 shows different aerodynamic configurations, namely:
  in the first part of the approach phase, during which the aircraft is flying at the descent speed Vdes, a configuration CF1, called smooth configuration, for which the leading edge slats and the flaps of the aircraft are retracted;
  in a second part of the approach phase, during which the aircraft is decelerated from the descent speed Vdes to the approach speed Vapp, a configuration CF2, for which the leading edge slats and the flaps are partially extended, then a configuration CF3, for which the leading edge slats and the flaps are in the landing position; and
  in the final part of the approach phase, for which the aircraft flies at the approach speed Vapp, a configuration CF3 for which the leading edge slats and the flaps are in the landing position and the landing gear is lowered.

The invention claimed is:
1. A method for servocontrolling speed-wise an aircraft that is guided along an approach trajectory, in an approach phase for a landing on a landing runway, said approach phase being a phase during which the aircraft decelerates from a descent speed (Vdes) to an approach speed (Vapp), the method comprising:
  A/ determining via a processor a speed profile (PV) which illustrates a variation of the speed (V) of the aircraft along the approach trajectory as a function of the horizontal distance (D) of said aircraft relative to a fixed point (PF) that is linked to said landing runway used for the landing, said speed profile (PV) comprising a reference deceleration point (Pd) which corresponds to the point where the aircraft has to begin to decelerate from the descent speed (Vdes), this reference deceleration point (Pd) being situated at a reference horizontal distance (DR) from said fixed point (PF);
  B/ calculating via a processor speed set points to enable the aircraft to observe said speed profile (PV); and
  C/ during the approach phase, applying via a processor said speed set points to the aircraft, while guiding the aircraft along said approach trajectory, wherein guiding the aircraft along said approach trajectory comprises:
    α) calculating via a processor an auxiliary horizontal distance by adding a first horizontal margin (M1) to said reference horizontal distance (DR), and defining an auxiliary deceleration point (P1) which is located upstream of said fixed point (PF) of said auxiliary horizontal distance along said approach trajectory;
    β) during the approach phase, when the aircraft reaches a control point (Pc) of the approach trajectory, which is situated upstream of said auxiliary deceleration point (P1) at least by a second horizontal margin (M2), carrying out via a processor a check to determine if said aircraft is able to reach an auxiliary fixed point downstream of the approach trajectory, at a required time of passage, within a time difference, if the aircraft observes said speed profile (PV); and a processor
    γ) defining via a processor, according to the check, an effective deceleration point (PE), at which the aircraft must effectively begin deceleration as defined on the speed profile (PV) at said reference deceleration point (Pd) in order to make the aircraft follow this speed profile (PV), this effective deceleration point (PE) which is used for servocontrolling the aircraft speed-wise corresponding:
    to said auxiliary deceleration point (P1) if, according to said check, said aircraft will pass said auxiliary fixed point at said required time of passage; or
    at a first offset point (P4) which is situated upstream of said auxiliary deceleration point (P1) if, according to said check, the aircraft will be upstream of said auxiliary fixed point at said required time of passage; or
    at a second offset point (P3) which is situated downstream of said auxiliary deceleration point (P1) if, according to said check, the aircraft will be downstream of said auxiliary fixed point at said required time of passage,
  wherein at least one of the first offset point and the second offset point (P3, P4) is offset, relative to said auxiliary deceleration point (P1), by a distance D1 which satisfies the following equation:

$$D1 = \frac{\Delta T}{\frac{1}{Vapp} - \frac{1}{Vdes}}$$

in which:
Vapp is the approach speed;
Vdes is the descent speed; and
ΔT represents a time adjustment to be made for the aircraft to reach said auxiliary fixed point at said required time of passage.

2. The method as claimed in claim 1, wherein said fixed point (PF) and said auxiliary fixed point correspond to the upstream threshold of the landing runway.

3. The method as claimed in claim 1, wherein said first and second horizontal margins (M1, M2) are equal.

4. The method as claimed in claim 1, wherein, in the step A/, said speed profile (PV) is determined by a retrograde calculation from the threshold of the landing runway where the aircraft must fly at the approach speed (Vapp) until at least a start of deceleration point from the descent speed (Vdes) in which corresponds to said reference deceleration point (Pd).

5. The method as claimed in claim 1, wherein, in the step β), the following operations are carried out:
calculating via a processor an estimated time of passage at said auxiliary fixed point as a function of the time of passage of the aircraft at said control point (Pc), the horizontal distance between said control point (Pc) and said auxiliary fixed point, and said speed profile (PV) determined in the step A/;
calculating via a processor a difference between said estimated time of passage and said required time of passage;
comparing via a processor the difference to said time difference; and
determining via a processor from the difference which of the following situations will apply:
the aircraft will be able to observe the required time of passage at said auxiliary fixed point;
the aircraft will be upstream of the auxiliary fixed point at the required time of passage;
the aircraft will be downstream of the auxiliary fixed point at the required time of passage.

6. The method as claimed in claim 1, further comprising determining via a processor an approach profile which the aircraft is made to follow, said approach profile comprising said speed profile (PV) and at least aerodynamic configuration information associated with said speed profile (PV).

7. A device for servocontrolling speed-wise an aircraft that is guided along an approach trajectory, in an approach phase for a landing on a landing runway, said approach phase being a phase during which the aircraft decelerates from a descent speed (Vdes) to an approach speed (Vapp), said device (1) comprising:
a flight management system (4) that determines a speed profile (PV) which illustrates a variation of the speed (V) of the aircraft along the approach trajectory as a function of the horizontal distance (D) of said aircraft relative to a fixed point (PF) that is linked to said landing runway used for the landing, said speed profile (PV) comprising a reference deceleration point (Pd) that corresponds to the point where the aircraft must begin to decelerate from the descent speed (Vdes), this reference deceleration point (Pd) being situated at a reference horizontal distance (DR) from said fixed point (PF);
a speed computation unit (7) configured to compute speed set points enabling the aircraft to observe said speed profile (PV); and
a guidance system (9) which, during the approach phase, applies said speed set points to the aircraft, while guiding the aircraft along said approach trajectory, wherein the guidance system also comprises:
a distance computation unit (15) configured to compute an auxiliary horizontal distance, by adding a first horizontal margin (M1) to said reference horizontal distance (DR), and defining an auxiliary deceleration point (P1) that is situated upstream of said fixed point (PF) by said auxiliary horizontal distance along said approach trajectory;
a checking unit (16) configured to check, during the approach phase, when the aircraft reaches a control point (Pc) of the approach trajectory, which is situated upstream of said auxiliary deceleration point (P1) at least by a second horizontal margin (M2), if said aircraft is able to reach an auxiliary fixed point downstream of the approach trajectory, at a required time of passage, within a time difference, if it observes said speed profile (PV); and
a defining unit (17) configured to define, according to the check implemented by said checking unit (16), an effective deceleration point (PE), at which the aircraft must effectively begin the deceleration as defined on the speed profile (PV) at said reference deceleration point (Pd) in order to make the aircraft follow this speed profile (PV), this effective deceleration point (PE) which is used for servocontrolling the aircraft speed-wise corresponding:
to said auxiliary deceleration point (P1) if, according to the check, said aircraft will reach said auxiliary fixed point at said required time of passage; or
to a first offset point (P4) that is situated upstream of said auxiliary deceleration point (P1) if, according to said check, the aircraft will be upstream of said auxiliary fixed point at the required time of passage; or
to a second offset point (P3) that is situated downstream of said auxiliary deceleration point (P1) if, according to said check, the aircraft will be downstream of said auxiliary fixed point at the required time of passage,
wherein at least one of the first offset point and the second offset point (P3, P4) is offset, relative to said auxiliary deceleration point (P1), by a distance D1 which satisfies the following equation:

$$D1 = \frac{\Delta T}{\frac{1}{Vapp} - \frac{1}{Vdes}}$$

in which:
Vapp is the approach speed;
Vdes is the descent speed; and
ΔT represents a time adjustment to be made for the aircraft to reach said auxiliary fixed point at said required time of passage.

8. The device as claimed in claim 7, which also comprises means (13) for determining said approach trajectory, and in which said guidance system (9) comprises means (12) for laterally and vertically guiding the aircraft along said approach trajectory.

9. An aircraft, which comprises the speed servocontrol device according to claim 7.

* * * * *